(12) United States Patent
Alleva et al.

(10) Patent No.: US 6,694,296 B1
(45) Date of Patent: Feb. 17, 2004

(54) METHOD AND APPARATUS FOR THE RECOGNITION OF SPELLED SPOKEN WORDS

(75) Inventors: Fileno A. Alleva, Redmond, WA (US); Mei-Yuh Hwang, Sammamish, WA (US); Yun-Cheng Ju, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 392 days.

(21) Appl. No.: 09/706,375

(22) Filed: Nov. 3, 2000

Related U.S. Application Data

(60) Provisional application No. 60/219,861, filed on Jul. 20, 2000.

(51) Int. Cl.[7] ............................................... G10L 15/28
(52) U.S. Cl. ..................... 704/255; 704/251; 704/257; 704/231
(58) Field of Search ............................. 704/251, 257, 704/255, 231

(56) References Cited

U.S. PATENT DOCUMENTS

| | | | | | |
|---|---|---|---|---|---|
| 5,865,626 | A | * | 2/1999 | Beattie et al. ............... | 434/185 |
| 5,995,928 | A | * | 11/1999 | Nguyen et al. ............. | 704/251 |
| 6,064,959 | A | * | 5/2000 | Young et al. ................ | 704/251 |
| 6,314,399 | B1 | * | 11/2001 | Deligne et al. ............. | 704/257 |
| 2002/0138265 | | * | 9/2002 | Stevens et al. ............. | 704/251 |

OTHER PUBLICATIONS

Isolated–word sentence recognition using probabilistic context–free grammar By:G.J.F. Jones et al. Eurospeech 91, 2nd European Conf. On Speech Comm. and Tech. Proceedings p. 487–9, vol. 2.

Context–free grammar driven, frame synchronous HMM–based continuous speech recognition methods using word spotting By: S. Nakagawa et al. Transactions of the Inst. of Electr., Information and Communication Engineers D–II vol. J76D–II, No. 7, p. 1329–36.

One–pass continuous speech recognition directed by generalized LR parsing By: K. Kita et al., ICSLP 94. 1994 Intertational Conference on Spoken Language Processing.

The ARISTOTLE speech recognition system By: C. Waters et al., Progress in Connectionist–Based Information Systems.

A context–free grammar compiler for speech understanding systems By: M.K. Brown et al. ICSLP 94. 1994 International Conference on Spoken Language Processing Part. vol. 1, p. 21–4.

(List continued on next page.)

*Primary Examiner*—Richemond Dorvil
*Assistant Examiner*—Qi Han
(74) *Attorney, Agent, or Firm*—Joseph R. Kelly; Westman, Champlin & Kelly, P.A.

(57) ABSTRACT

The speech recognizer includes a dictation language model providing a dictation model output indicative of a likely word sequence recognized based on an input utterance. A spelling language model provides a spelling model output indicative of a likely letter sequence recognized based on the input utterance. An acoustic model provides an acoustic model output indicative of a likely speech unit recognized based on the input utterances. A speech recognition component is configured to access the dictation language model, the spelling language model and the acoustic model. The speech recognition component weights the dictation model output and the spelling model output in calculating likely recognized speech based on the input utterance. The speech recognizer can also be configured to confine spelled speech to an active lexicon.

17 Claims, 6 Drawing Sheets

OTHER PUBLICATIONS

Efficient word–graph parsing and search with a stochastic context–free grammar By: C.J. Waters et al., 1997 IEEE Workshop on Automatic Speech Recognition and Understanding Proceedings.

Dynamic programming parsing for context–free grammar in continuous speech recognition By: H. Ney, IEEE Transactions on Signal Processing, vol. 39, No. 2, p. 336–40.

Using a stochastic context–free grammar as a language model for speech recognition By: D. Jurafsky, et al., 1995 International Conference on Acoustics, Speech, and Signal Processing. Part 1, 189–92, vol. 1.

Development of an effective context–free parser for continuous stochastic languages By: L.R. Strydom et al., AFRICON 96'. Incorporating AP–MTT–96 and COMSIG–96.

Reliable utterance segment recognition by integrating a grammar with statistical language constraints By: H. Tsukada et al., Speech Communication vol. 26, No. 4, p. 299–309.

Active middleware services in a decision support system for managing highly available distributed resources By: S.A. Fakhouri et al., International Conf. On Distributed Systems Platforms and Open Distributed Processing. Lecture Notes in Computer Science vol. 1795, p. 349–71.

Improving scalability of event–driven distributed objects architectures. By: D. Mencnarowski et al., Poland Journal: Software–Practice and Experience vol. 30, No. 13, p. 1509–29.

Improved spelling recognition using a tree–based fast lexical match. By: C.D. Mitchell et al., 1999 IEEE International Conf. On Acoustics, Speech and Signal Proceedings. vol. 2, p. 597–600.

Event management components for the 3/sup rd/ generation OSS By: S, Desrochers et al., Proceedings of Network Operations and Management Symposium Conference Date: Apr. 10–14 2000 Conference Location: Honolulu, HI, USA.

A context–dependent similarity measure for strings By: E. Tanaka. Transactions of the Institute of Electronics and Communication Engineers of Japan, Part A, VO.. J67A, No. 6, p. 612–13.

READY: a high performance event notification service By: Gruber, R.E. et al. Proceedings 16th International Conference on Data Engineering Conference Sponsor: IEEE Comput. Soc. Tech. Committee on Data Eng. Conference Date: Feb. 29–Mar. 3, 2000 Conference Location: San Diego, CA, USA.

An event notification framework based on Java and CORBA By: Tomono, M. Japan Conference Title: Integrated Network Management VI. Distributed Management for the Networked Millennium.

Mobile streams By: Ranganathan, M et al., Proceedings of the Sixth Annual Tcl/Tk Conference p.203–4 Publisher: USENIX Assoc, Berkeley, CA, USA Publication Date: 1998.

A flexible and recoverable client/server database event notification system By: Hanson, E.N. et al., VLDB Journal vol. 7, No. 1, p. 12–24, 1998.

Using events to build distributed applications Author(s): Bacon, J. et al., Second International Workshop on Services in Distributed and Networked Environments Conference Sponsor: IEEE Comput. Soc. Tech. Committee on Distributed Process Conference Date: Jun. 5–6, 1995.

High–Performance Alphabet Recognition, IEEE Speech and Audio Processing, By: Philipos C. Loizue et al. Nov. 1996, vol. 4, No. 6, pp. 430–445.

Speaker–Independent Name Retrieval From Spellings Using a Database of 50,000 Names, By: Ronald A. Cole et al., 1991 International Conference on Acoustics, Speech, and Signal Processing vol. 5, pp. 325–328.

IBM Voicetype Software, By: R. Fletcher, IEE Colloquium on the Language Toolkit Engineers in Business.

Temporal Decomposition and Acoustic–Phonetic Decoding for the Automatic Recognition of Continuous Speech By: P. Deleglise et al. 9th International Conference on Pattern Recognition. vol. 11, pp. 839–841.

Improving Recognizer Acceptance Through Robust, Natural Speech Repair By: Arthur E. McNair et al., 1994 International Conference on Spoken Language Processing. pp. S22–15.1 –S22–15.4.

Automated Directory Listing Retrieval System Based on Isolated Word Recognition By: Bernd Aldefeld et al., Proceedings of the IEEE, vol. 68, No. 11, Nov. 80 pp. 1364–1379.

Empirical evaluation of interactive multimodal error correction, By: Suhm, B., 1997 IEEE Workshop on Automatic Speech Recognition and Understanding Proceedings.

Noise robust speech recognition makes in–car navigation safe and affordable By: Smolders, J. et al., 'Steps Forward'. Proceedings of the Second World Congress on Intellectual Transport Systems '95 Yokohama Part vol. 2 p. 601–4 vol. 2.

Building a listener engine: a Smalltalk interface to speech recognition By: LaLonde, W., Pugh, J. Journal: Journal of Object Oriented Programming (JOOP) vol. 10, No. 7 1997–1998.

Tools for developing voice–operated applications By: Newstadt, R.E., Speech Technology vol. 4, p. 62–6.

Examining Microsoft's Speech SDK By: Davis, P., Dr. Dobb's Journal vol. 24, No. 7 p. 86, 88–90. 1999.

Speech processing technology towards pratical use By: Shirai, K.; Kobayashi, T.; Kudo, I., Joho Shori vol. 38, No. 11 p. 971–5.

Recent improvements on Microsoft's trainable text–to–speech system–Whistler By: Haung, X et al., 1997 IEEE International Conference on Acoustics, Speech and Signal Processing (Cat. No. 97CB36052) Part vol. 2 p. 959–62 vol. 2.

Software text–to–speech By: Hallahan, W.J.; Vitale, A.J., Journal: International Journal of Speech Technology vol. 1, No. 2 p. 121–34.

Japanese text–to–speech software (FLUET) based on waveform synthesis method By: Hakoda, K.; Tsukada, H.; Hirokawa, T.; Yoshida, Y.; Mizuno, H.

DECtalk Software: text–to–speech technology and implementation By: Hallahan, W.I., : Digital Technical Journal vol. 7, No. 4 p. 5–19.

The InfoPad user interface By: Burstein, A. et al., Digest of Papers. COMPCON '95 Technologies for the Information Superhighway.

\* cited by examiner

FIG. 7
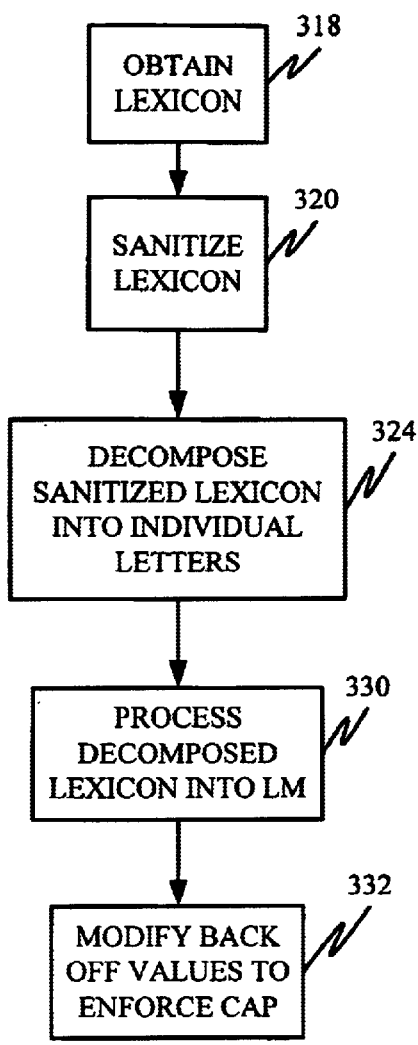
FIG. 8
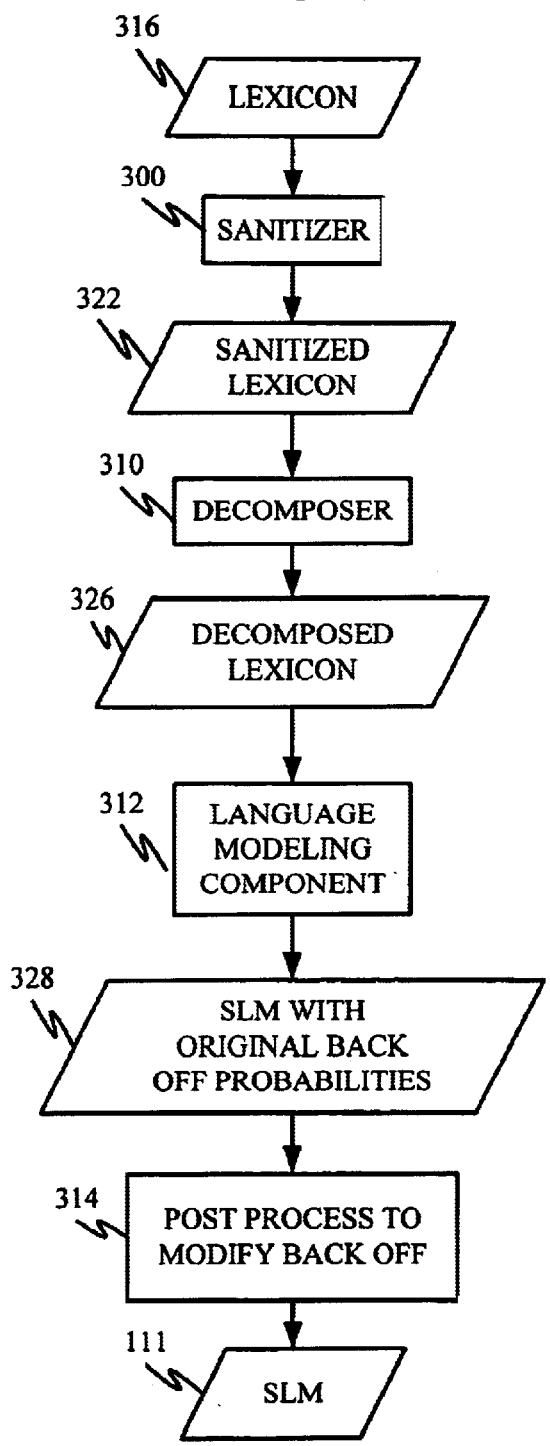
FIG. 8A
<S> E. N. T. E. R. </S>
<S> E. N. T. E. R. E. D. </S>
<S> E. N. T. E. R. I. N. G. </S>
<S> N. O. </S>
<S> N. O. T. </S>
<S> N. O. T.E. </S>

METHOD AND APPARATUS FOR THE RECOGNITION OF SPELLED SPOKEN WORDS

The present application is based on and claims the benefit of U.S. provisional patent application Serial No. 60/219,861, filed Jul. 20, 2000, the content of which is hereby incorporated by reference in its entirety.

BACKGROUND OF THE INVENTION

The present invention relates to speech recognition. More specifically, the present invention relates to the recognition of spoken, spelled words.

In speech recognition systems, an input speech signal is converted into words that represent the verbal content of the speech signal. This conversion begins by converting the analog speech signal into a series of digital values. The digital values are then passed through a feature extraction unit, which computes a sequence of feature vectors based on the digital values. Each feature vector represents a section of the speech signal.

The feature vectors are then used to identify the most likely sequence of words that would have generated the sequence of feature vectors. Typically, this involves applying the feature vectors to an acoustic model to determine the most likely sequences of sub-word units, typically senones, and then using a language model to determine which of these sequences of sub-word units is most likely to appear in the language. This most likely sequence of sub-word units is identified as the recognized speech.

In many systems, the sub-word units are concatenated to form words, and sequences of words. A language model is accessed to determine a most likely sequence of words. The language model provides a statistical probability of any sequence of words. For example, a trigram language model provides the statistical probability of any three-word sequence. The structure and operation of such language models is well known.

Though some current speech recognition systems attain a high degree of accuracy, they do make mistakes. For example, in a dictation (or document creation) system, a user may be rapidly dictating into the speech recognition system. The system may also provide a graphical output, in the nature of a display, displaying the words, as recognized. If the user notices that a word has been mis-recognized, the user may attempt to correct the word. This often entails the user first selecting the mis-recognized word by highlighting it with a mouse, keyboard, or other user input device. The user then attempts to correct the word using a number of techniques, such as re-speaking the word, or by spelling the word out loud.

However, recognizing spoken, spelled words is very difficult, and presents many problems, primarily due to the existing acoustic similarities among certain groups of letters. There are many confusable groups of letters, most notably "E-set" which is formed of the letters b, c, d, e, g, p, t, v and z. Because of the minimal acoustic differences between letter pairs in the E-set, it is recognized as being one of the most confusable sets in the task of recognizing spoken letters. A number of other, less confusable groups, present similar problems as well.

Because of the problems present with recognizing spoken letters, prior speech recognizers invoked dedicated spoken letter recognition systems. This has required the user to affirmatively take action to enter a special spelling recognition mode in order to spell spoken words. Still other systems required the user to spell using the military alphabet (i.e, alpha, bravo, Charlie, etc.). However, this required the user to know the military alphabet, and also required a special purpose lexicon in the speech recognition system to recognize those words.

SUMMARY OF THE INVENTION

The speech recognizer includes a dictation language model providing a dictation model output indicative of a likely word sequence recognized based on an input utterance. A spelling language model provides a spelling model output indicative of a likely letter sequence recognized, based on the input utterance. An acoustic model provides an acoustic model output indicative of a likely speech unit recognized based on the input utterances. A speech recognition component is configured to access the dictation language model, the spelling language model and the acoustic model. The speech recognition component weights the dictation model output and the spelling model output in calculating likely recognized speech based on the input utterance. The speech recognizer can also be configured to confine spelled speech to an active lexicon. The present invention can also be practiced as a method.

Another feature of the present invention is directed to creation of the spelling language model. A lexicon is decomposed into individual letters and is then processed into the spelling language model.

BRIEF DESCRIPTION OF THE DRAWINGS

FIG. 7 is a flow diagram illustrating one embodiment of creating a spelling language model.

FIG. 8 is a block diagram of a spelling language model calculator in accordance with one aspect of the present invention.

FIG. 8A illustrates a portion of a decomposed lexicon in accordance with one illustrative embodiment of the present invention.

DETAILED DESCRIPTION OF THE ILLUSTRATIVE EMBODIMENTS

Figure 1:
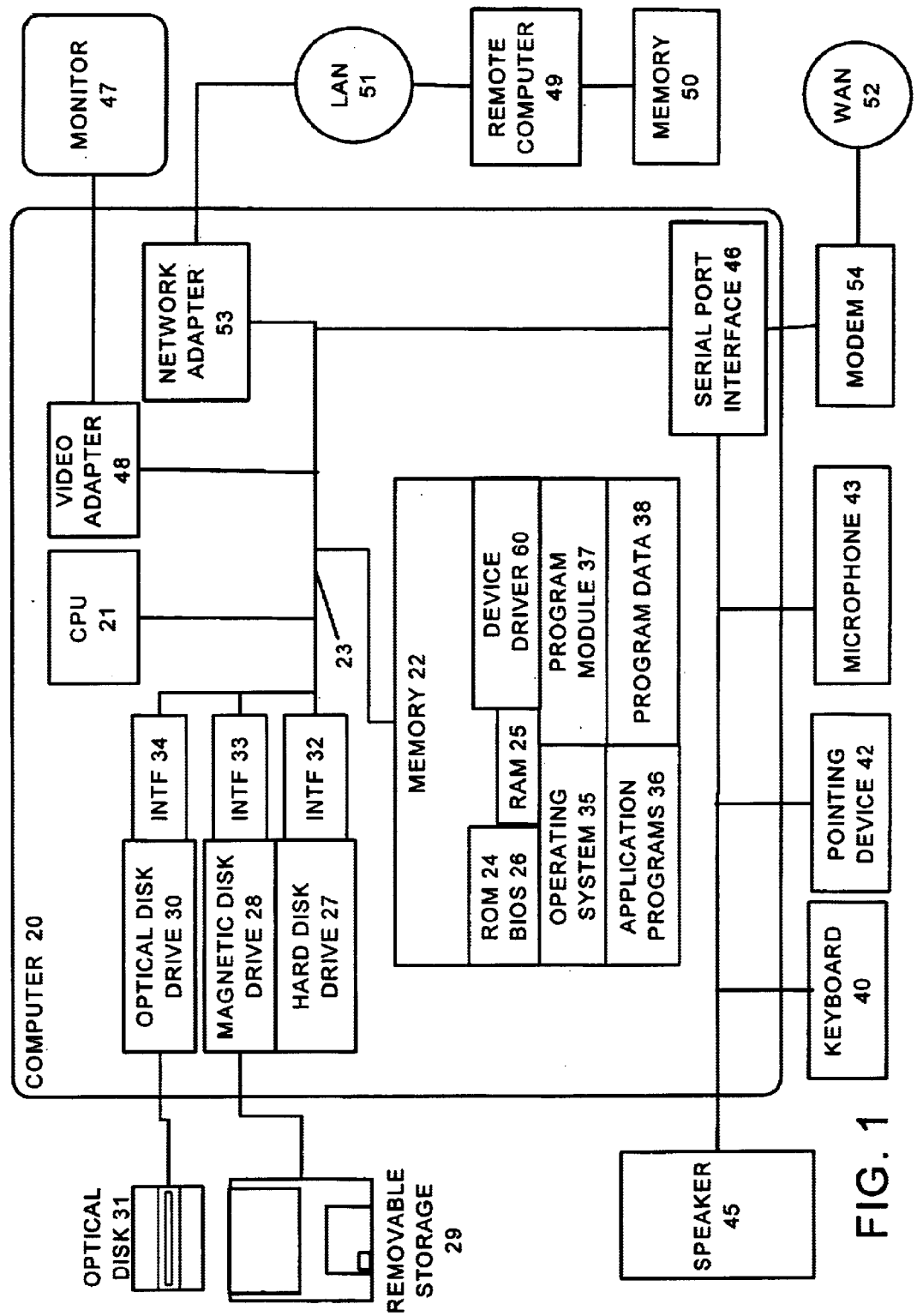
FIG. 1 is a block diagram of one embodiment of a general environment for implementing the speech recognition system in accordance with one aspect of the present invention.

FIG. 1 and the related discussion are intended to provide a brief, general description of a suitable computing environment in which the invention may be implemented. Although not required, the invention will be described, at least in part, in the general context of computer-executable instructions, such as program modules, being executed by a personal computer. Generally, program modules include routine programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit (CPU) 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory 22 includes read only memory (ROM) 24 and random access memory (RAM) 25. A basic input/output (BIOS) 26, containing the basic routine that helps to transfer information between elements within the personal computer 20, such as during start-up, is stored in ROM 24. The personal computer 20 further includes a hard disk drive 27 for reading from and writing to a hard disk (not shown), a magnetic disk drive 28 for reading from or writing to removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, magnetic disk drive interface 33, and an optical drive interface 34, respectively. The drives and the associated computer-readable media provide nonvolatile storage of computer readable instructions, data structures, program modules and other data for the personal computer 20.

Although the exemplary environment described herein employs the hard disk, the removable magnetic disk 29 and the removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memory (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through local input devices such as a keyboard 40, pointing device 42 and a microphone 43. Other input devices (not shown) may include a joystick, game pad, satellite dish, scanner, or the like. These and other input devices are often connected to the processing unit 21 through a serial port interface 46 that is coupled to the system bus 23, but may be connected by other interfaces, such as a sound card, a parallel port, a game port or a universal serial bus (USB). A monitor 47 or other type of display device is also connected to the system bus 23 via an interface, such as a video adapter 48. In addition to the monitor 47, personal computers may typically include other peripheral output devices, such as a speaker 45 and printers (not shown).

The personal computer 20 may operate in a networked environment using logic connections to one or more remote computers, such as a remote computer 49. The remote computer 49 may be another personal computer, a hand-held device, a server, a router, a network PC, a peer device or other network node, and typically includes many or all of the elements described above relative to the personal computer 20, although only a memory storage device 50 has been illustrated in FIG. 1. The logic connections depicted in FIG. 1 include a local area network (LAN) 51 and a wide area network (WAN) 52. Such networking environments are commonplace in offices, enterprise-wide computer network Intranets, and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a network environment, program modules depicted relative to the personal computer 20, or portions thereof, may be stored in the remote memory storage devices. It will be appreciated that the network connections shown are exemplary and other means of establishing a communications link between the computers may be used. For example, a wireless communication link may be established between one or more portions of the network.

Although FIG. 1 shows an exemplary environment, the present invention is not limited to a digital-computing environment. In particular, the present invention can be operated on analog devices or mixed signal (analog and digital) devices. Furthermore, the present invention can be implemented on a single integrated circuit, for example, in small vocabulary implementations.

Figure 2:
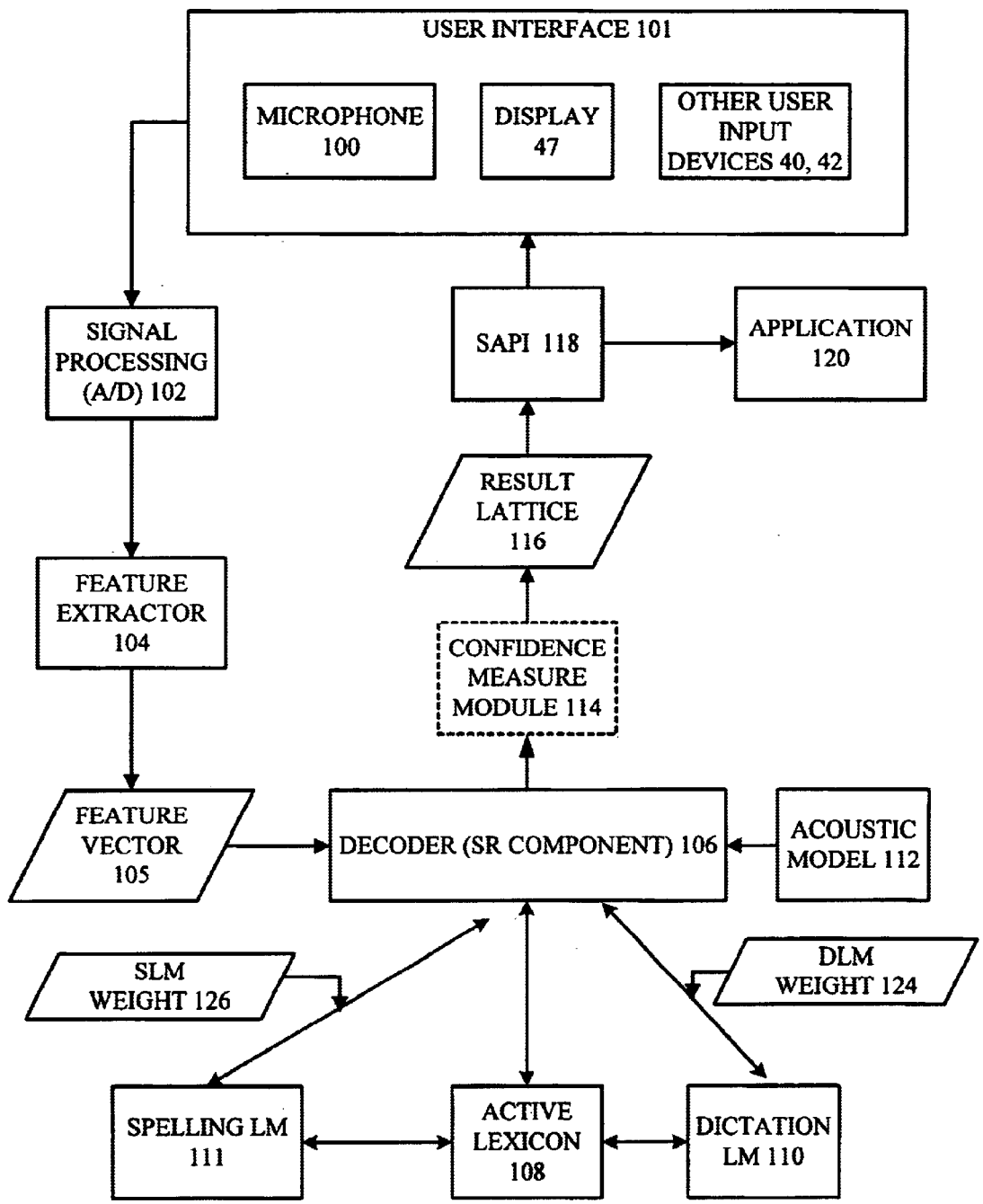
FIG. 2 is a block diagram of the speech recognition system in accordance with one illustrative embodiment of the present invention.

FIG. 2 provides a more detailed block diagram of modules of the general environment of FIG. 1 that are particularly relevant to the present invention. In FIG. 2, an input analog speech signal is converted into an electrical signal, by a microphone 100. The electrical signal is then converted into a series of digital values by an analog-to-digital converter 102. In one embodiment, A-to-D converter 102 samples the analog signal at 16 kHz with a 16 bit resolution thereby creating 16,000 samples of speech data per second, or 32 kilobytes of speech data per sound.

The digital data is provided to a feature extractor 104 that extracts a feature 105 from the digital signal. Some examples of feature extraction modules include modules for performing Linear Predictive Coding (LPC), LPC derived cepstrum, Perceptive Linear Prediction (PLP), Auditory model feature extraction, and Mel-Frequency Cepstrum Coefficients (MFCC) feature extraction. Note that the invention is not limited to these feature extraction modules and that other modules may be used within the context of the present invention.

The feature extraction module 104 receives the stream of digital values and produces a stream of feature vectors 105 that are each associated with a frame of the input signal. In many speech embodiments, the frames are 20 milliseconds in length and the centers of the frames are separated by 10 milliseconds, although this is mentioned for exemplary purposes only.

The stream of feature vectors 105 produced by the extraction module 104 is provided to a decoder (or speech recognition component) 106, which accesses spelling language model 111, lexicon 108, dictation language model 110, and acoustic model 112 and identifies a most likely sequence of patterns based on the stream of feature vectors.

In one illustrative embodiment, acoustic model 112 is a Hidden Markov Model consisting of a set of states, with each frame of the input matched to one frame of the input signal. Each state has an associated set of probability distributions that describe the likelihood of an input feature vector matching a particular state. The model also includes probabilities for transitioning between two neighboring model states as well as allowed transitions between states for particular pattern units. The size of the pattern units can be different for different embodiments of the present invention. For example, for speech recognition embodiments where the pattern units are linguistic units, the pattern units may be senones, phonemes, diphones, triphones, syllables, or even whole words.

Lexicon 108 consists of a list of words or labels that identify the patterns to be recognized. Such a lexicon may comprise linguistic words or syllables.

Dictation language model 110 provides a set of likelihoods that a particular sequence of patterns will appear in the environment of interest. For example, language model 110 provides a set of likelihoods that a particular sequence of words will appear in a particular language. In one illustrative speech embodiment, the language model is based on a text database such as the North American Business News (NAB), which is described in greater detail in a publication entitled CSR-III Text Language Model, University of Penn., 1994. The language model may be a context-free grammar or a statistical N-gram model such as a trigram. In one embodiment, the language model is a compact trigram model that determines the probability of a sequence of patterns based on the combined probabilities of three-pattern segments of the sequence. For example, the trigram model is based on the combined probabilities of three-word segments.

The spelling language model 111 provides a statistical probability of any sequence of letters. In one illustrative embodiment, a letter trigram language model is used which provides the probability of any three-letter sequence. However, any other letter language model which provides a statistical estimate of the letter probability can be used.

In performing speech recognition, decoder 106 weights the output of dictation language model (DLM) 110 and spelling language model (SLM) 111 with a DLM weight 124 and a SLM weight 126, respectively. Based on the acoustic model, the language models, and the lexicon, decoder 106 identifies a most likely sequence of patterns from all possible pattern sequences. The particular method used to select the most probable sequence of patterns is discussed further below.

The most probable sequence of hypothesis patterns can be provided as a result lattice 116 to optional confidence measure module 114. Confidence measure module 114 identifies which patterns ate most likely to have been improperly identified by the recognizer. Confidence measure module 114 then provides, at its output, the sequence of hypothesis patterns along with identifiers indicating which patterns may have been improperly identified. Those skilled in the art will recognize that confidence measure module 114 is not necessary for the practice of the present invention.

In any case, a result lattice 116 is eventually provided to speech application programming interfaces (SAPI) 118 which provides the result lattice in a desired format, to application program 120. In one illustrative embodiment, application program 120 is a word processing or dictation program for generating a document.

User interface 101 includes an optional display 47 (such as a monitor) to display the words as they are spoken. User interface 101 also includes other user input devices which can be used to provide signals to the remainder of the speech recognition system, either directly, or through SAPI 118. As will be discussed later in the application, such input signals configure the speech recognition system to recognize spelled spoken words and to add additional words to active lexicon 108.

Figure 3:
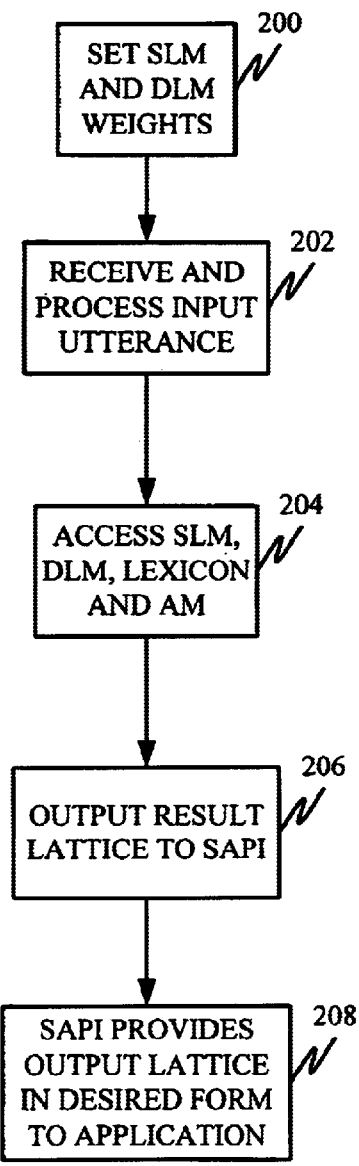
FIG. 3 is a flow diagram illustrating the operation of the system shown in FIG. 2 in normal dictation mode.

FIG. 3 is a flow diagram illustrating the operation of the speech recognition system shown in FIG. 2 during normal dictation. In the normal dictation mode, the user is simply speaking into the microphone to create a document. In one illustrative embodiment, during normal dictation, decoder 106 sets DLM weight 124 and the SLM weight 126 to be approximately equal. That is because it may be equally likely that the user is speaking words as opposed to spelling words. This is indicated by block 200. The system then receives and processes an input utterance, through signal processing 102 and feature extractor 104 as discussed above. This is indicated by block 202. Next, the speech recognition system simply performs normal recognition, giving equal weight to the contributions of the DLM 110 and SLM 111. Therefore, decoder 106 accesses DLM 110, SLM 111, lexicon 108 and acoustic model 112 and decodes the recognized speech. This is indicated by block 204.

After decoding the likely recognized speech, decoder 106 either provides it to confidence measure model 114 or as a result lattice 116 to SAPI 118. This is indicated by block 206. SAPI 118 provides the output lattice in a desired form to application 120. This is indicated by block 208.

Figure 4:
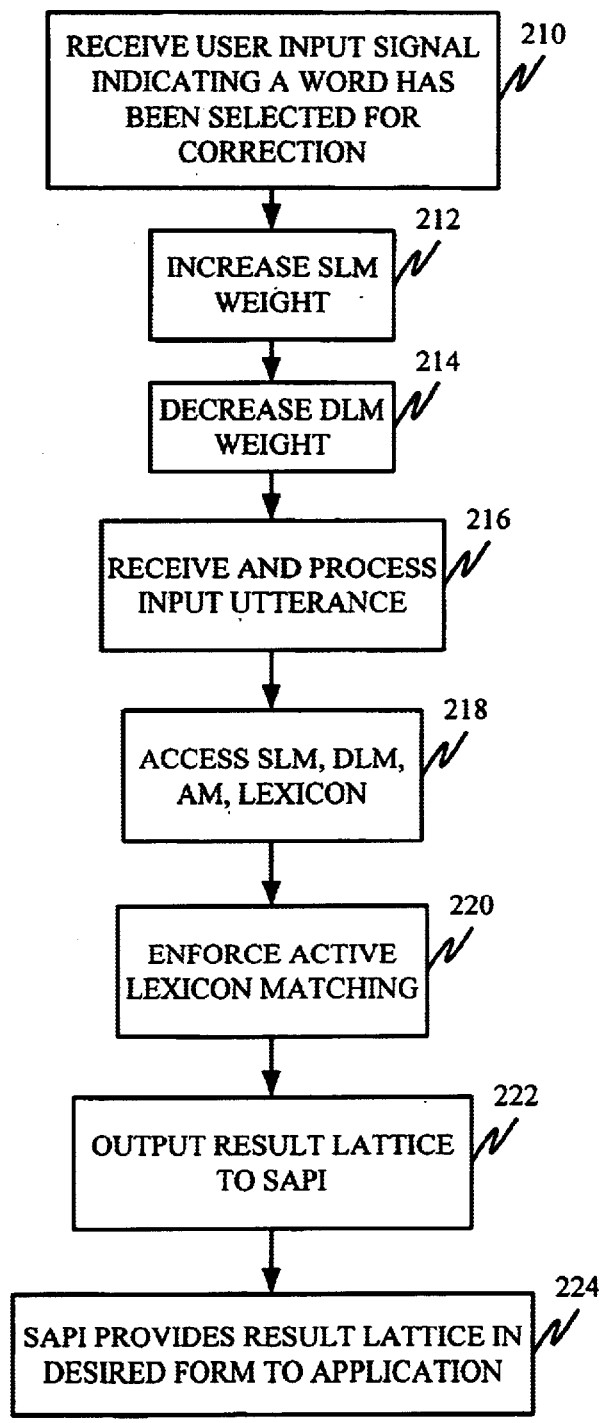
FIG. 4 is a flow diagram illustrating the operation of the system shown in FIG. 2 when the user has selected a word for correction.

FIG. 4 is a flow diagram which better illustrates the operation of the system shown in FIG. 2 when the user has selected a word for correction. First, the user provides a signal, through microphone 100 or other user input devices 40, 42, etc. selecting a word for correction. This is indicated by block 210. Once a word has been selected for correction, the posterior probability of a spelled input exceeds that of a spoken word. Therefore, DLM weight 124 is decreased while SLM weight 126 is increased. In one illustrative embodiment, for example, DLM weight 124 is set to 0.4 while SLM weight 126 is set to 0.6. Increasing SLM weight 126 and decreasing DLM weight 124 is indicated by blocks 212 and 214 in FIG. 4.

This essentially biases the speech recognition system to more likely expect a spelled input, rather than a spoken word, based on whether the user is likely speaking words or spelling. This also avoids the need to have the user explicitly enter a spelling mode, by requiring a specified user input to change operating modes of the speech recognition system. It also avoids the burden for the user to remember which mode he/she is in at any time instant.

Once the SLM and DLM weights are set accordingly, the input utterance is received and processed through signal processing 102 and feature extractor 104, as discussed above. This is indicated by block 216.

Next, decoder 106 accesses SLM 111, DLM 110, acoustic model 112, and lexicon 108. This is indicated by block 218. In decoding the speech signal, in one illustrative embodiment, decoder 106 enforces active lexicon matching. In order to do this, decoder 106 can either require a recognized word to already exist in active lexicon 108, or it can simply weight those words higher than recognized words which are not located in active lexicon 108. In either case, the system is illustratively biased to favor known words since, under most circumstances, the user is attempting to access a word which is already in lexicon 108, as opposed to adding a new word. Enforcement of active lexicon matching is indicated by block 220.

After the speech signal has been decoded, decoder 106 provides the output lattice 116 to either confidence measure module 114 or to SAPI 118. This is indicated by block 222. SAPI 118, in turn, provides the output lattice in a desired form to application program 120. This is indicated by block 224.

Figure 5:
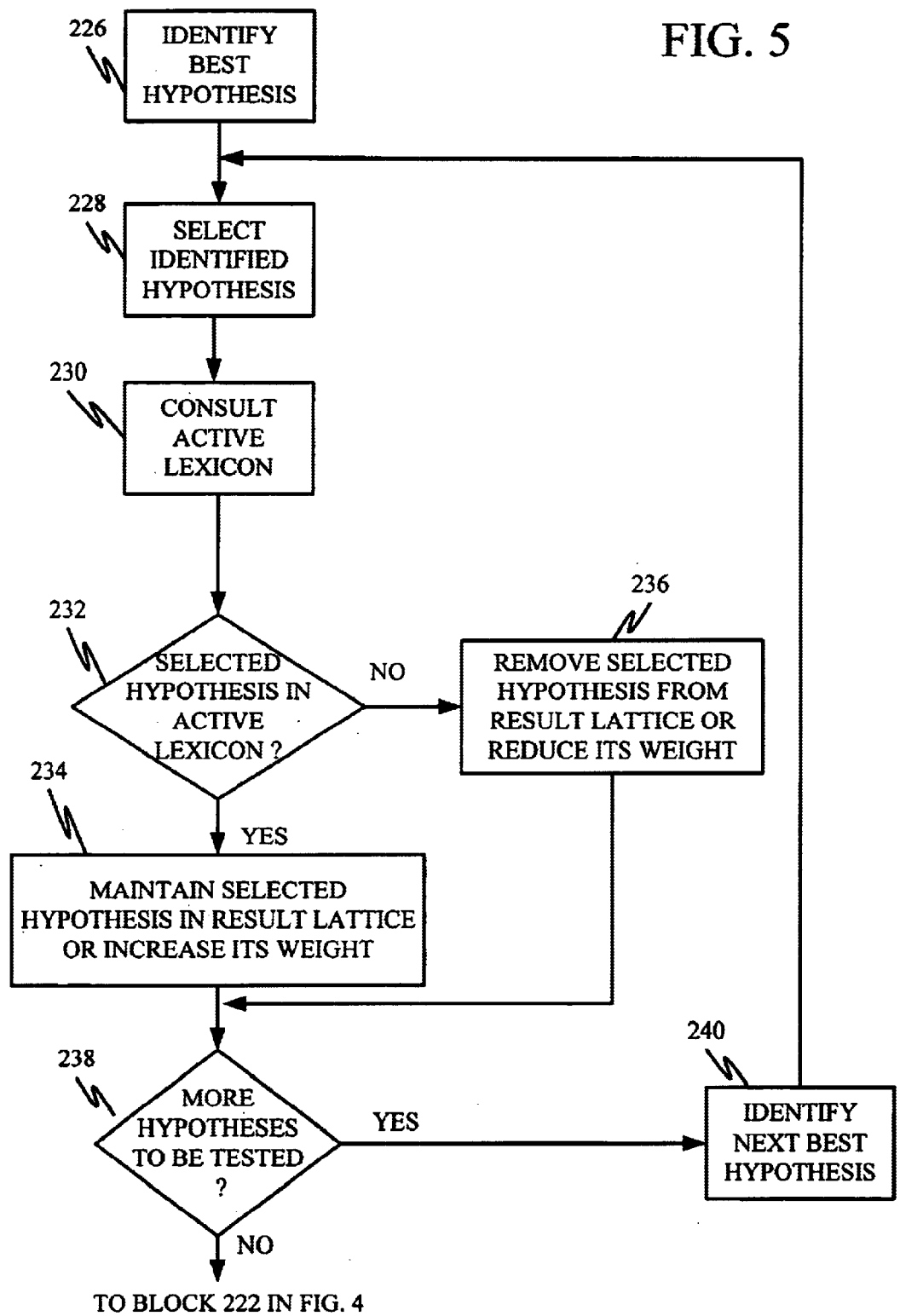
FIG. 5 is a flow diagram illustrating the enforcement of active lexicon matching in accordance with one illustrative embodiment of the present invention.

FIG. 5 is a flow diagram which more clearly illustrates the enforcement of the active lexicon matching described at block 220 in FIG. 4. First, the most likely recognized hypothesis is identified. This is indicated by block 226. That hypothesis is selected and decoder 106 consults active lexicon 108 to determine whether the hypothesized word is in the active lexicon. This is indicated by blocks 228, 230 and 232.

If the selected hypothesis is located within active lexicon 108, then it is maintained in the result lattice, or it is given an increased weight. This is indicated by block 234. If the selected hypothesis is not in active lexicon 108, however, then it is either removed from the result lattice, or it is given a reduced weight. This is indicated by block 236.

It is then determined whether any additional hypotheses are to be tested. This is indicated by block 238. If not, processing continues at block 222 in FIG. 4. If so, then the next best hypothesis is identified and selected, as indicated at blocks 240 and 228.

Figure 6:
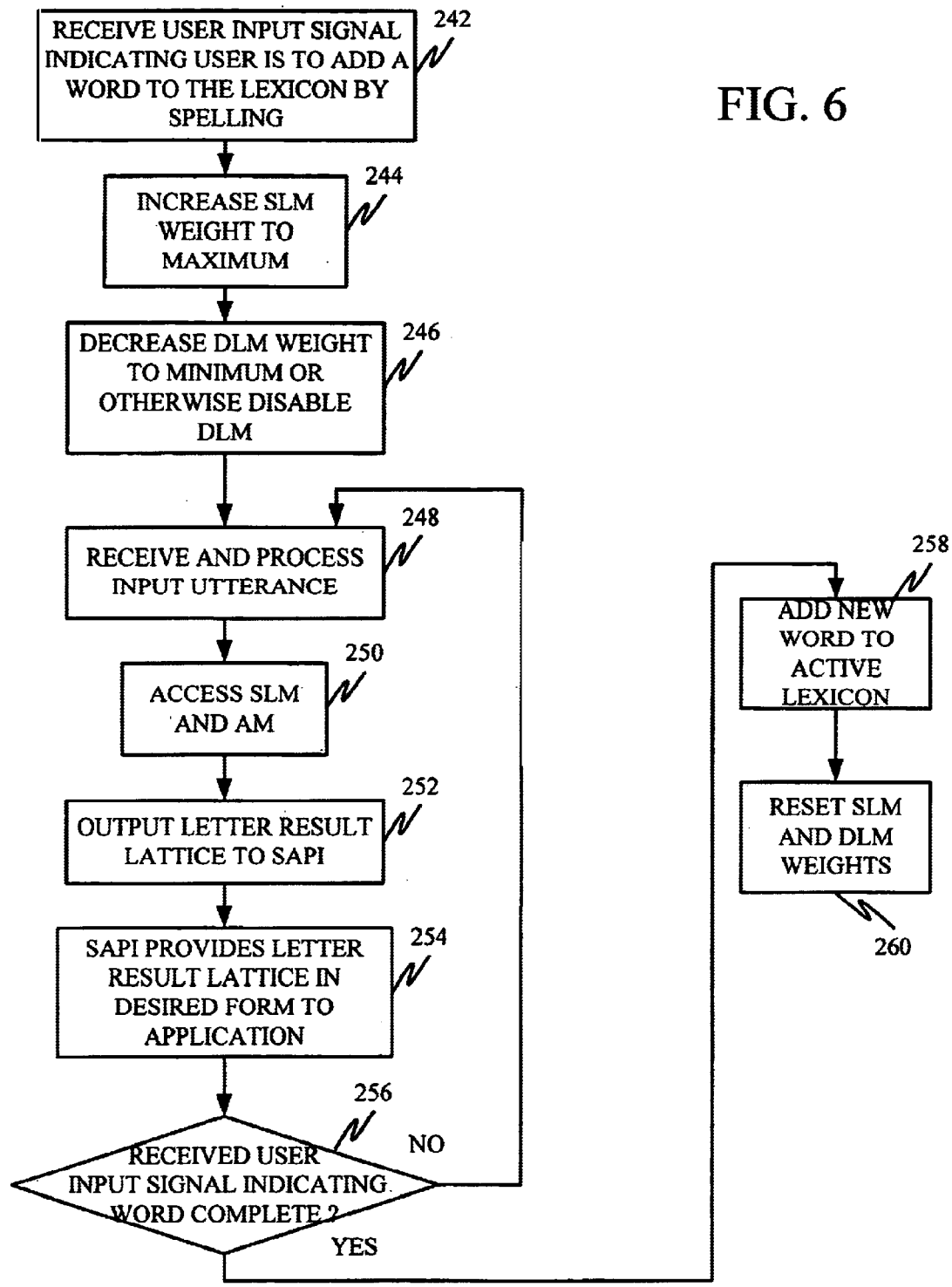
FIG. 6 is a flow diagram illustrating the operation of the system shown in FIG. 2 in adding a new word to the lexicon, in accordance with one embodiment of the present invention.

FIG. 6 is a flow diagram illustrating the operation of the speech recognition system in a word addition mode in which the user can add a new word to active lexicon 108. In one illustrative embodiment, the user enters this mode by providing a user input signal through user interface 101, indicating that the user wishes to add a new word. The user is then illustratively provided with a dialog box having a blank field therein which fills in when the user spells the new word to be added. Providing the user input signal as indicated by block 242 in FIG. 6.

Upon entering the word addition mode, DLM weight 124 is reduced to zero and SLM weight 126 is increased to its maximum value. This is done because it is now known that the user will be spelling the new word, rather than simply dictating words in the normal fashion. Therefore, the effect of dictation language model 110 on the recognized speech is reduced to zero by weighting. Of course, DLM 110 can also be switched out of the recognition process in any other way as well. Increasing SLM weight 126 and decreasing DLM weight 124 is indicated by blocks 244 and 246.

Once the SLM and DLM weights are set appropriately, the input utterance is received and processed though signal processing 102 and feature extractor 104. This is indicated by block 248. Decoder 106 then decodes the speech signal by accessing SLM 111 and acoustic model 112. This is indicated by block 250. The result lattice 116 of letter hypotheses is then output either to confidence measurement module 114 or to SAPI 118. This is indicated by block 252. SAPI 118, in turn, provides result lattice 116 in a desired form to application program 120 which continues to fill in the open field in the dialog box as the user speaks. This is indicated by block 254.

Once the entire word has been spelled and, illustratively, appears on the display, then the user provides an enter signal or any other user input signal indicating that the addition of the new word is complete. If that signal is not received, then it is determined that the new input word requires recognition of another letter. This is indicated by block 256. In that case, processing continues at block 248. Otherwise, once the new word has been entirely spelled into the system, and the user has provided the signal indicating that the word addition is complete, the new word is added to active lexicon 108. This is indicated by block 258. The DLM weight 124 and SLM weight 126 are then set back to their original values. This is indicated by block 260.

FIGS. 7 and 8 and 8A illustrate the creation of SLM 111 in accordance with but one exemplary embodiment of the present invention. FIG. 7 is a flow diagram illustrating the creation of SLM 111, while FIG. 8 is a block diagram of an SLM calculator. FIG. 8A illustrates a portion of a decomposed lexicon which is generated in creating SLM 111.

The SLM calculator shown in FIG. 8 includes sanitizer 300, decomposer 310, language modeling component 312 and post processor 314. First, a conventional lexicon 316 is obtained. This is indicated by block 318 in FIG. 7. The lexicon can be downloaded, created, retrieved from another source, etc. Once the lexicon is obtained, sanitizer 300 sanitizes lexicon 316, as indicated by block 320 in FIG. 7. Sanitizer 300 removes non-words, such as acronyms, from lexicon 316 and also removes one and two letter words from lexicon 316. Such words tend to pollute the language model and lead to the introduction of non-word alternatives.

The sanitized lexicon 322 is provided to decomposer 310 where the sanitized lexicon is decomposed into individual letters. FIG. 8A illustrates a portion of a decomposed lexicon. The tags <S> and </S> indicate the beginning and ending of a phrase, respectively. It can be seen in FIG. 8A that the words "enter", "entered", "entering", "no", "not" and "note" have all been decomposed, into "phrases" composed of letter strings. Decomposing the lexicon is illustrated by block 324 in FIG. 7.

The decomposed lexicon 326 now appears as a text corpus which can be processed using conventional methods into a language model. Therefore, decomposed lexicon 326 is provided to language modeling component 312 which processes the decomposed lexicon into a language model. Substantially any language modeling procedure can be used in order to process the decomposed lexicon into a language model. One such language modeling technique is set out in S. Katz, *Estimation of Probabilities From Sparse Data for the Language Model Components of a Speech Recognizer*, IEEE Trans. ASSP. Vol. ASSP-35, P.400, March 1987. This procedure is given for exemplary purposes only. Processing the decomposed lexicon 326 into a spelling language model 328 using language modeling component 312 is indicated by block 330 in FIG. 7.

In the embodiment in which the language modeling procedure in Katz is used, a backoff model is implemented to calculate a backoff probability of unseen events (such as sequences which are not seen in the training data). In one illustrative embodiment, the present invention biases the system against backing off to an unseen event by reducing or capping the backoff probability. For example, in one illustrative embodiment, the backoff probability is reduced to, at most, a value of 0.0001. This reduces the likelihood that the backoff probability will introduce incorrect words into the recognition process. Modifying the backoff values to enforce the cap, using post processor block 314, is indicated by block 332 in FIG. 7. The result is SLM 111.

It can thus be seen that the present invention eliminates the need for the user to enter a special spelling mode in order to spell a spoken word. The present invention also improves the accuracy of spelling spoken words by incorporating a statistical model of spelling, which biases the system to recognize spelled spoken words under certain circumstances, where it is believed that the user is likely spelling, rather than simply speaking entire words. The present system also improves spelling recognition accuracy, by, under certain circumstances, enforcing active lexicon matching. In addition, the present invention provides a mechanism by which the user can add words to the active lexicon using spoken spelling. The present invention also provides a system and method for creating a spelling language model in accordance with the present invention.

Although the present invention has been described with reference to preferred embodiments, workers skilled in the art will recognize that changes may be made in form and detail without departing from the spirit and scope of the invention.

What is claimed is:

1. A speech recognizer recognizing speech based on an input utterance, comprising:
 a dictation language model accessible to provide a dictation model output indicative of a likely word recognized based on an input utterance, given one or more preceding words;
 a letter-based spelling language model accessible to provide a spelling model output indicative of a likely letter recognized based on the input utterance, given one or more preceding letters;
 an acoustic model accessible to provide an acoustic model output indicative of a likely speech unit recognized based on the input utterance; and
 a speech recognition component configured to access the dictation language model, the spelling language model and the acoustic model and to weight the dictation model output and the spelling model output and calculate likely recognized speech based on the input utterance and one of the weighted dictation model output and the weighted spelling model output, the weight of the dictation model output and the weight of the spelling model output determining which output is used to recognize the speech in the input utterance.

2. The speech recognizer of claim 1 and further comprising:
 an active lexicon, coupled to at least one of the speech recognition component and the spelling language model, containing entries indicative of currently used words.

3. The speech recognizer of claim 2 and further comprising:
 a user interface providing a user input change signal indicative of a user attempting to change a previously recognized word, and wherein the speech recognition component is configured to adjust the weight of the spelling model output based on the user input change signal.

4. The speech recognizer of claim 3 wherein the speech recognition component is configured to increase the weight of the spelling model output based on the user input change signal and correspondingly decrease the weight of the dictation model output.

5. The speech recognizer of claim 3 wherein the spelling language model is configured to provide the spelling model output based on the entries in the active lexicon.

6. The speech recognizer of claim 5 wherein the spelling model output is limited to sequences of letters that form the entries in the active lexicon.

7. The speech recognizer of claim 2 and further comprising:
 a user interface providing a user input add signal indicating a user request to add a word to the active lexicon, and wherein the speech recognition component is configured to reduce the weight of the dictation model output, and increase the weight of the spelling model output based on the user input add signal.

8. The speech recognizer of claim 7 wherein the speech recognition component is configured to reduce the weight of the dictation model output to substantially zero, and increase the weight of the spelling model output to a substantial maximum value, based on the user input add signal.

9. The speech recognizer of claim 7 wherein the user interface is configured to provide a restore signal indicative of a user request to return to a normal speech recognition mode and wherein the speech recognition component is configured to restore the weights on the spelling model output and the dictation model output to values prior to receiving the user input add signal.

10. The speech recognizer of claim 9 wherein the speech recognition component is configured to restore the weights on the language model output and the spelling model output to substantially equal weights.

11. A method of recognizing speech with a speech recognizer that includes at least a dictation language model accessible to provide a dictation model output indicative of a likely word sequence recognized based on an input utterance and a spelling language model accessible to provide a spelling model output indicative of a likely letter sequence recognized based on the input utterance, the method comprising:
 receiving the input utterance;
 accessing at least the dictation language model and the spelling language model;
 biasing weights on the dictation model output and the spelling model output based on a likelihood that the user is spelling spoken words; and
 calculating likely recognized speech based on the weighted spelling model output and the weighted dictation model output.

12. The method of claim 11 wherein biasing weights, comprises:
 biasing the weights based on whether the user has selected a word for correction.

13. The method of claim 12 wherein biasing the weights comprises:
 if the user has selected a word for correction, increasing the weight on the spelling model output; and
 decreasing the weight on the dictation language model output.

14. The method of claim 11 wherein the speech recognizer includes a lexicon and further comprising:
 biasing recognition of spelled spoken words to words found in the lexicon.

15. The method of claim 11 wherein the speech recognizer includes a lexicon, and further comprising:
 receiving a user input signal indicative of a user request to add a word to the lexicon;
 adjusting the weights on the dictation model output and the spelling model output based on the user input signal;
 receiving utterances indicative of spoken letters forming the word to be added;
 accessing the spelling language model to recognize letters represented by the utterances; and
 adding the word to the lexicon.

16. The method of claim 15 wherein adjusting the weights comprises:
 reducing the weight on the dictation model output to substantially a minimum value; and
 increasing the weight on the spelling model output to substantially a maximum value.

17. The method of claim 15 wherein adding the word to the lexicon comprises:
 receiving a user input signal indicating that the word to be added is complete;
 storing the word in the lexicon; and
 restoring the weights on the dictation model output and the spelling model output to previous values.

* * * * *